United States Patent [19]
Miller, Jr. et al.

[11] 4,083,271
[45] Apr. 11, 1978

[54] LATHE APPARATUS

[75] Inventors: William Reed Miller, Jr.; Worthy Joseph Forward, Jr., both of Rochester, N.Y.

[73] Assignee: USM Corporation, Boston, Mass.

[21] Appl. No.: 778,610

[22] Filed: Mar. 17, 1977

[51] Int. Cl.[2] .............................................. B23B 5/34
[52] U.S. Cl. ......................................... 82/8; 82/40 R
[58] Field of Search .................................... 82/8, 40 R

[56] References Cited
U.S. PATENT DOCUMENTS

| 2,497,690 | 2/1950 | Roberts | 82/40 R |
| 2,545,050 | 3/1950 | Schurr | 82/40 R |
| 3,345,892 | 10/1967 | Dombrowski | 82/8 |

Primary Examiner—Leonidas Vlachos
Attorney, Agent, or Firm—Donald N. Halgren; Richard B. Megley; Vincent A. White

[57] ABSTRACT

A lathe arrangement to turn down or grind worn tread surfaces of railroad wheels to a prescribed profile, the lathe arrangement including a wheel securing apparatus. The wheel securing apparatus comprises a plurality of driver arms pivotally supported on a rotatable face plate. Means are provided to move the driver arms radially so that they may engage the front face of the rim of any diameter railroad wheel. The means to move the driver arms includes a movable mechanical linkage connected to each driver arm to permit their synchronous radial movement.

11 Claims, 6 Drawing Figures

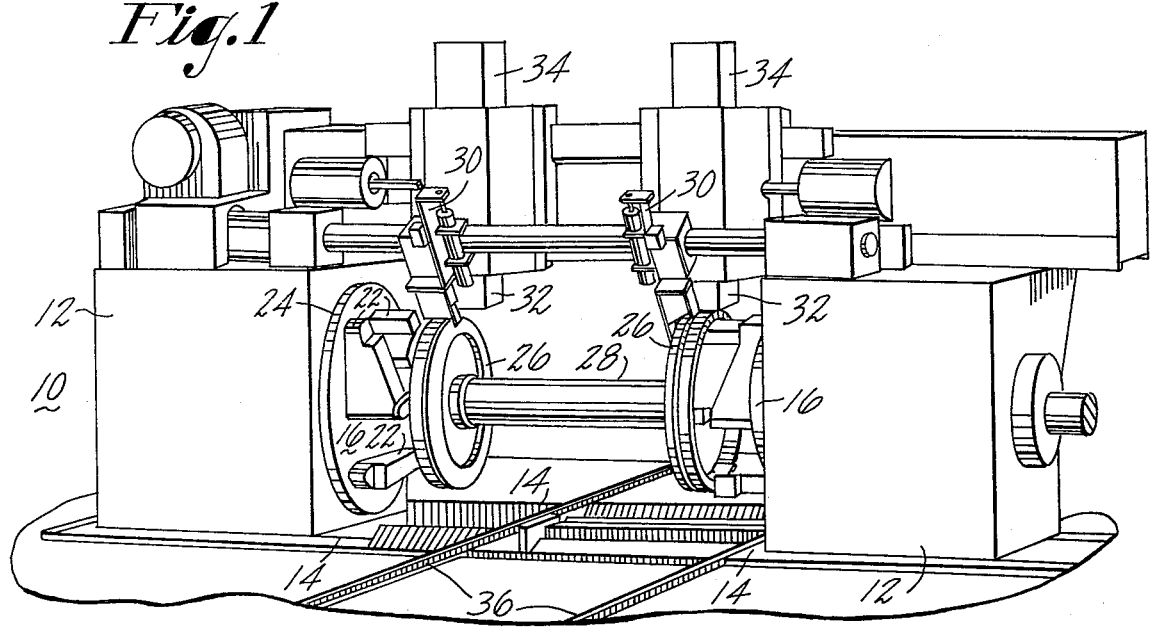
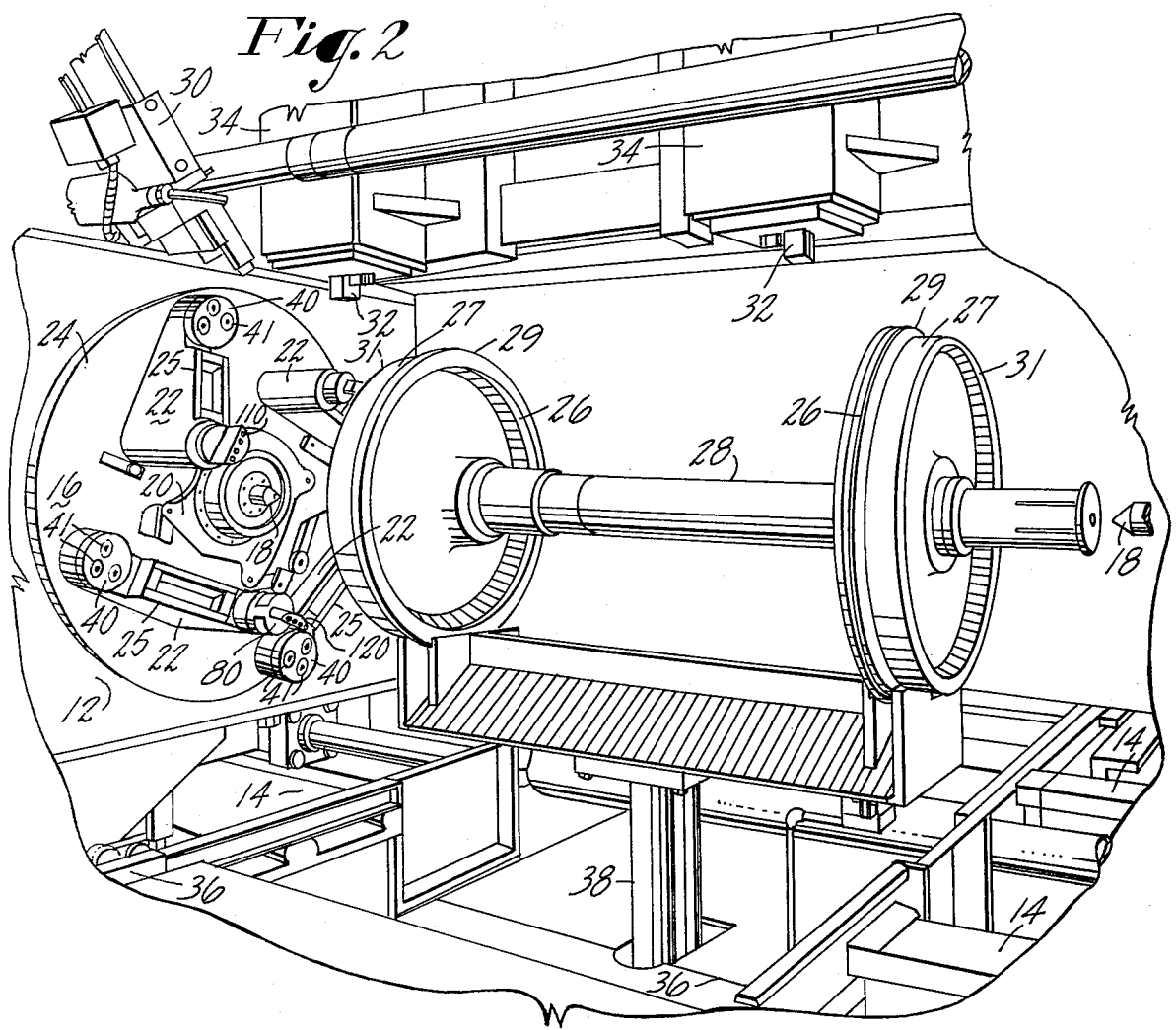

LATHE APPARATUS

BACKGROUND OF THE INVENTION

1. Field of the Invention

This invention relates generally to lathes, and more particularly to wheel securing devices for turning of railroad wheels on a lathe.

2. Prior Art

Wheel maintenance is an important item for the safety and efficiency of railroads. The tread or rolling surface is originally machined with close tolerances, to a specific contour. This contour consists of a tread which gradually tapers outward from its axis from the front face of the rim of the wheel to a radially outwardly extending flange which culminates in the flange edge of the wheel. This surface engages the rail in a manner which causes maxiumum wear in the transition area between the front face of the rim and the flange. Historically, worn railroad wheels have been reclaimed by machining the wheel to a new diameter at which there is sufficient material to restore the original contour. This process must be performed equally around the wheel tread circumference of both wheels in a set. There is, of course, minimum requirements for flange thickness and wheel diameter which limit the number of times a wheel can be reclaimed on a lathe.

The wheel turning lathes of the prior art are subsrtantially manually adjusted. The wheel securing elements of the prior art have their bases held in generally radially directed T-slots that are milled in the surface of the rotatable face plate. Large grooves or T-slots are not only expensive and time consuming to produce in the face plates of a lathe, but they also weaken the structure of the plate. Since the wheel securing elements in the completed prior art face plates are adjusted manually and individually, it increases the machine down-time.

An improvement in the lathe gaging of railroad wheels was shown in U.S. Pat. No. 3,938,254, and assigned to the assignee of the present invention.

An object of the present invention is to provide automatic adjustment of the railroad wheel securing devices in wheel lathe machines.

A further object of the present invention is to provide a railroad wheel securing mechanism which will function for any diameter railroad wheel.

A still further object of the present invention is to provide a railroad wheel securing mechanism that safely counters the forces incurred in the wheel as the tread is being machined.

A yet another object of the present invention is to provide a railroad wheel securing mechanism that is less expensive, stronger and more efficient than prior art railroad wheel lathe securing devices.

BRIEF SUMMARY OF THE INVENTION

A railroad wheel lathe machine has a pair of opposed head stocks, each slidably mounted toward and away from each other on a pair of ways. Each head stock includes a face plate which rotates about a center. The centers axially support a pair of railroad wheels and an axle, along its axis. An arrangement of driver arms are pivotally mounted on the face plate. A yoke is mounted about the center on the face plate. Each arm is linked to the yoke. After a set of railroad wheels is secured between the centers of the respective heads of the machine, one of the driver arms is adjusted so that its bit members which comprise the gripping portions, bitingly engages the outer face of the railroad wheel. The linkage and the yoke cause corresponding synchronous adjustment of the other bits on the other driving arms to evenly frictionally engage their respective peripheral portions of the outer face of the railroad wheel. Once all the driver arms are properly located on the face of both wheels, the head stocks are biased towards one another securing the wheels between the gripping portions of the driver arms, and the railroad wheel is ready for machining to produce a new tread or rolling surface thereon.

BRIEF DESCRIPTION OF THE DRAWINGS

The objects and advantages of the present invention will become more apparent when viewed in conjunction with the following drawings in which:

FIG. 1 is a perspective view of a wheel grinding lathe constructed according to the principles of the present invention;

FIG. 2 is a perspective view of the lathe and wheels in a disengaged position;

DESCRIPTION OF THE PREFERRED EMBODIMENT

Figure 3:
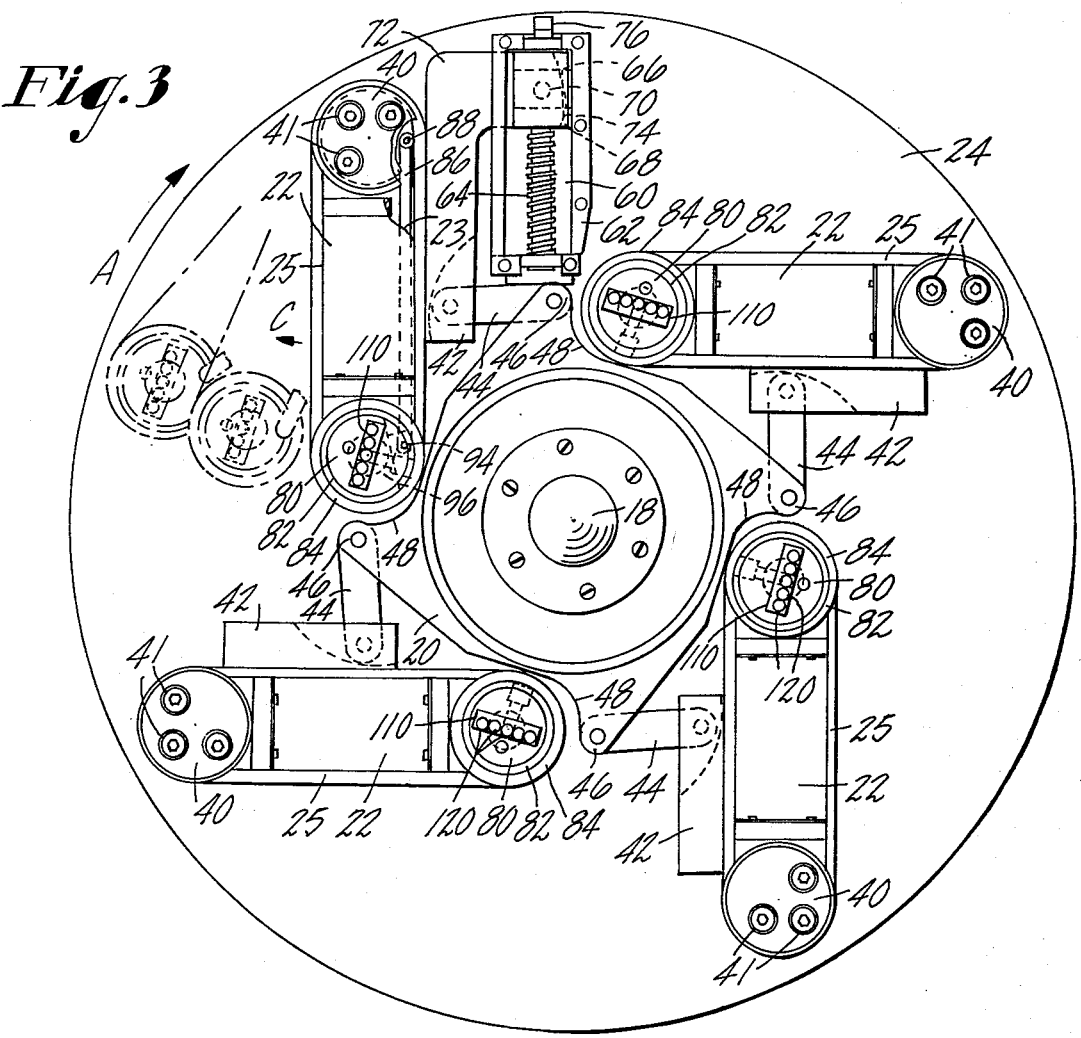
FIG. 3 is a plan view of a lathe head with its wheel securing apparatus in a close-in position.

Referring now to the drawings in detail, and particularly to FIGS. 1 and 2, there is shown a lathe 10 comprising a pair of head stocks 12, each being movably mounted on a pair of ways 14. Each head stock 12 includes a power spindle 16 comprising a tapered center 18, a yoke 20 and an arrangement of pivotable driver arms 22, all mounted on a rotatable face plate 24.

A set of railroad wheels 26 and its axle 28 is supportively disposed between the head stocks 12 as shown in FIG. 1. Each wheel 26 has an outer face 31, a tread 27 to be machined accordingly, and a circumferential flange 29 disposed around the periphery of the rear side of the wheel 26. A gaging assembly 30, extends off of each head stock 12, to determine the size and characteristics of the wheel being operated upon. The gaging assembly 30 is fully described in the aforementioned U.S. Pat. No. 3,938,254. A cutting tool 32 is movably supported in a tool carriage 34 above each wheel 26, and will eventually operate on the tread 27 of the wheel 26.

The railroad wheels 26 are brought to the lathe 10 on a set of rails 36 where they are lifted up to be coaxial with the tapered centers 18 by a jacking unit 38, as shown in FIG. 2. The position of the railroad wheels 26, as shown in FIG. 2, may be just after or just before machining of the wheels 26. Each head stock 12 has its center 18 disengaged from the ends of the axle 28, and is withdrawn thereaway on their ways 14. The face plate 24 is shown with its pivotable driver arms 22 drawn to their radially innermost position, adjacent the yoke 20.

A more detailed view of the face plate 24 and its associated mechanism is shown in FIG. 3, which all rotate according to the arrow A. This Figure shows four driving arms 22, though there could be fewer or more. Each driving arm 22 is a generally elongated member, pivotably attached to the face plate 24, by a driver pivot post 40. The pivot post 40 is attached to the face plate 24 by a plurality of bolts 41 about a center stud 43. Each driving arm 22 has a housing 25, having a mid-point aong which a shoulder plate 42 is fixedly attached; the plate 42 being disposed parallel to the face plate 24. A linkage bar 44 has one end which is pivotably connected to each shoulder plate 42, so that it pivots at about the mid-point of th driver arm 22. The other end of each linkage bar 44 is pivotably connected to a corner 46, of the yoke 20. Since there are four driver arms 22, and four linkage bars 44, in this embodiment, there are four corners 46 on the yoke 20, which is generally of a square shape, and is centrally, rotatively disposed about the center 18. On one side of each corner 46 of the yoke 22, there is a generally semicircular cut-out portion 48 to provide room for the free swinging end of each driver arm 22.

Figure 4:
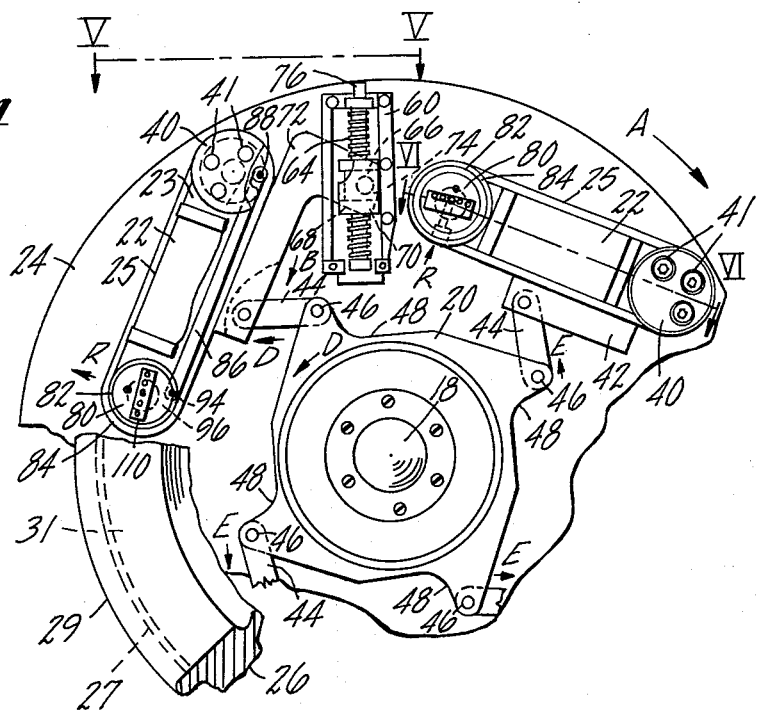
FIG. 4 is a view similar to FIG. 3, with the wheel securing apparatus in a pivoted position.

One driver arm 22, the one shown in the upper left-hand corner of FIGS. 3 and 4, in this embodiment, is a master driver arm 23. That is, it has an adjusting mechanism 60 to control the radial movement of the free swinging end of the driver arm 23 with respect to the center 18.

The adjusting mechanism 60 comprises an elongated enclosure 62, secued to the face plate 24. Supportively journalled within the enclosure 62, is an adjustment screw 64. A nut 66 is disposed about the adjustment screw 64, and a slide bar 68 is attached to the face plate side of the nut 66. A pivot pin 70 is attached to and extends from the slide bar 68, through an L-shaped member 72. The member is attached to the side of the master driver arm 23, similar to the disposition of the shoulder plates 42 to the other driver arms 22. A linkage bar 44 is similarly connected between the member 72 on the master driver arm 23 and the yoke 20 as they are between the other driver arms 22 and the yoke 20. The end portion of the member 72, that is, that portion articulated with the adjusting mechanism 60, has a curved outer end 74. The radially outer end of the adjustment screw 64 has a fitting 76 adapted to mate with a turning means.

Each driver arm 22, (including the master driver arm 23), has a reciprocably mounted driver piston 80 pressurizably disposed and keyed in a positioning cylinder 82. The positioning cylinder 82 is rotatively disposed in a containment housing 84, which is cylindrically shaped, and comprises the free swinging end of each driver arm 22, as shown in FIG. 6.

Figure 6:
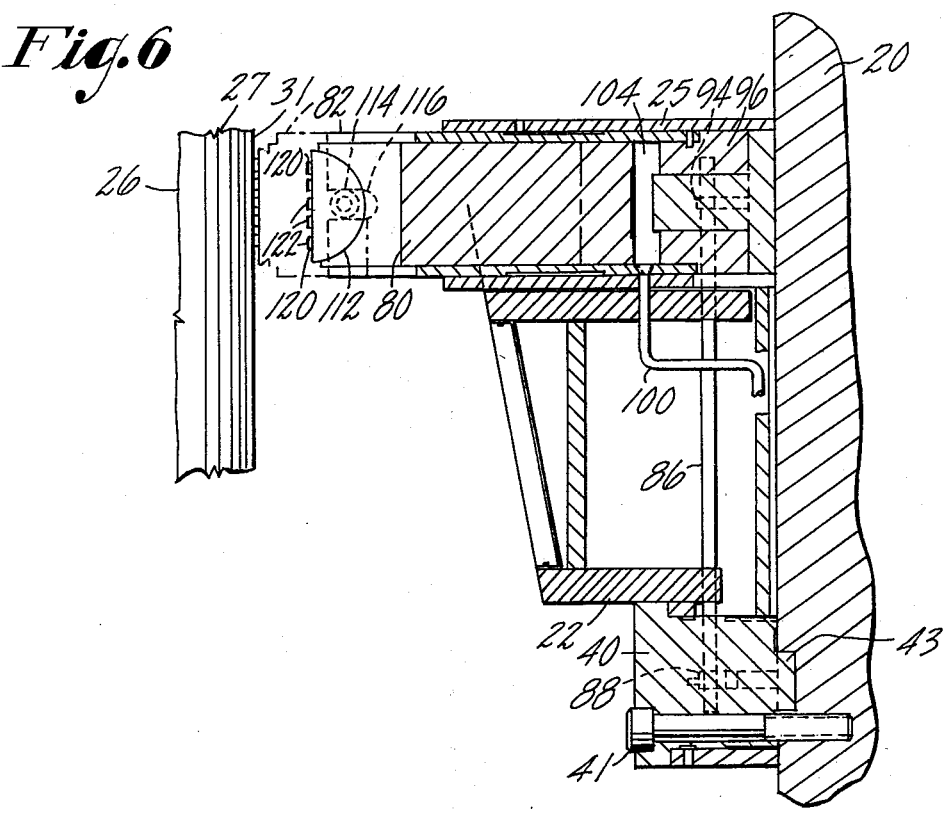
FIG. 6 is a view taken along the lines VI—VI of FIG. 4.

A swing lever 86 in each driver arm, 22 or 23, has one end that pivots about a fixed pin 88 in the driver pivot post 40, as shown in FIGS. 3, 4 and 6. The other end of the swing lever 86 is pivotably connected through suitable openings, to a pin 94 in an end plate 96 in the free swinging end of the arm, 22 or 23. A fluid pressure line 100 from a fluid pressure source, not shown, extends into a cavity 104 defined by the positioning cylinder 82 between the driver piston 80 and the end plate 96. Since the driver arms 22 do pivot to a certain limited extent, the pressure line 100 must be of flexible construction. Each pressure line 100 is part of a closed hydraulic circuit and is in pressurizable fluid communication with each cavity 104 of the other driver arms 22, including the master driver arm 23.

Figure 5:
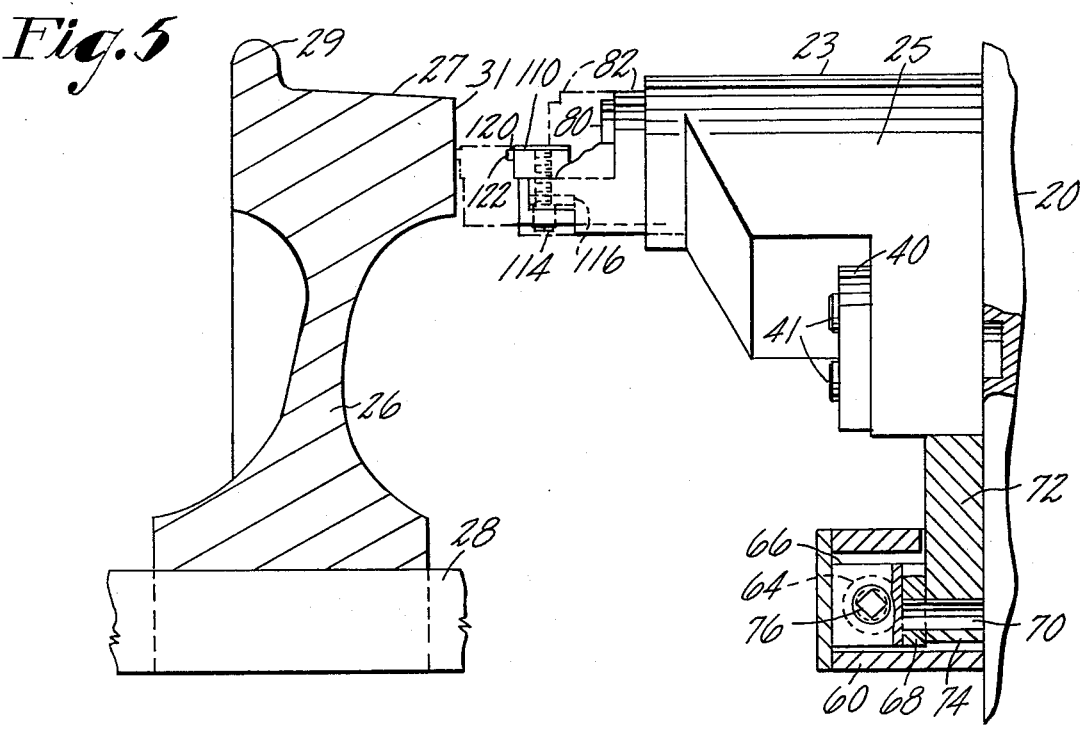
FIG. 5 is a view taken along the lines V—V of FIG. 4.

The distal end of each driver piston 80 movably holds a driver bit block 110 as shown in FIGS. 5 and 6. The driver bit block 110 is a planar member of semi-circular configuration whose curvilinear surface mates with a corresponding curvilinear surface 112 in the outer end of each driver piston 80. The driver bit block 110 has a key 114 and slot 116 arrangement with the driver piston 80 to insure that any rotation of the cylinder 82 will cause a corresponding rotation of the driver piston 80 and the driver bit block 110 and to secure the driver bit block 110 in the end of the driver piston 80. A plurality of bits 120 are generally linearly disposed across the top surface of the driver block 110. Each bit 120, is of generally cylindrical configuration, having a concave outer end 122, producing a generally circular knife-edge bite into the face 31 of the wheel 26.

The lathe 10 operating process begins after the railroad wheels 26 and axle 28 have rolled on the rails 36 to the jacking unit 38, as shown in FIG. 2. The head stocks 12 of the lathe 10 move toward one another on their ways 14 as soon as the axle 28 has been coaxially aligned with the extended centers 18 on each power spindle 16. The process of gaging the wheel size and shape takes place, as described in the aforementioned U.S. Pat. No. 3,938,254. With the head stocks 12 still advancing and the wheels 26 still being held by the centers 18, the bits 120 extending off of each driver block 110 are about to come into contact with the face 31 of rhe wheel 26 as shown in FIGS. 5 and 6. The head stocks 12 press against the wheels 26 with a force of about 60,000 lbs., in this embodiment.

The bits 120 all coincide with the face 31 of the wheel 26, due to the adjustment of the master driver arm 23 and the corresponding synchronous movement of the other driver arms 22. The master driver arm 23 is pivoted outwardly about its pivot post 40 when the fitting 76 on the end of the adjustment screw 64 is turned. Rotation of the adjustment screw 64 causes the nut 66 on the screw 64 to travel along its enclosed path. Th nut 66 carries the slide bar 68 and the pivot pin 70 with it as it moves. The pivot pin 70 is in registration with the outer end 74 of the anchor 72. The clockwise motion of the anchor 72, as indicated by an arrow B in FIG. 4, causes the free swinging end of the master driver arm 23 to move radially outwardly along the face plate 24, as indicated by an arrow C, as partially shown by phantom lines pivoted to its maximum extent in FIG. 3, and as indicated by the letter "P", and as is shown with the driver block 110 at a point adjacent the face 31 of the wheel 26 in FIG. 4.

As the free swinging end of the master driver arm 23 is pivoting radially outwardly from the center 18, the linkage bar 44 that is connected to the member 72 from one corner 46 of the yoke 20 causes the yoke 20 to turn in a counter-clockwise direction, as indicated by an arrow D in FIG. 4. This counter-clockwise rotation of the yoke 20, acting through each of the other linkage bars 44 (as indicated by an arrow E), a corresponding synchronous pivoting of the free swinging ends of the driver arms 22 outwardly in a generally radial direction, as indicated by an arrow R.

The swing lever 86, in each of the driver arms (22 and 23), maintains the generally circumferential disposition of each of the driver blocks 110 as the driver arms 22 or 23 pivot inwardly and outwardly. The swing lever 86 pivots about its fixed pin 88 that is secured to the driver pivot post 40. The pin 94 pivotably secures the other end of the swing lever 86 with the end plate 96 in the base of the postioning cylinder 82, as shown in FIGS. 3, 4 and 6. The positioning cylinder 82 is rotatably disposed within the containment housing 84. Since the driver piston 80 rotates when the positioning cylinder 82 rotates, and since the driver block 110 is fixed to the outer end of the driver piston 80, the disposition of each of the driver blocks 110 with respect to the center 18, is always the same. That is, the array of bits 120 follows roughly a circumferential path, irrespective of the location of the free swinging end of any pivotable driver arm (22 or 23).

It is to be noted that all of the driver arms (22 or 23), are symmetrical about the wheel 26 or the axis of rotation. There is no force excess on any of them. The force of the wheel 26 against the bits 120, (60,000 lbs. between the heads 12), causes the base of the driver arms (22 and 23), to come into frictional engagement with the face plate 20, and prevents any further movement therebetween during machine operation. The head stocks 12 moving toward one another provide the force for the frictional engagement between the face plate 24, the driver arms 22 and 23, and the wheel 26.

If one or both of the wheels 26 was at all skewed on its axle 28, the pressurizable nature of the cavities 104 causes the driver pistons 80 to react accordingly. Each driver piston 80 may travel axially within the positioning cylinder 82 to permit accommodation with any skewness found in any particular wheel 26 being operated upon. EAch cavity 104 within each positioning cylinder 82 is in pressurized fluid communication with every other cavity 104 in the other driver arms (22 or 23) all comprising a closed hydraulic circuit permitting reciprocable fluctuation therewith. The skewness of any wheel would affect the entirety of that wheel. That is, where one driver piston 80 may have to extend itself to have its bits 120 contact the face of the wheel, another driver piston 80 may have to retract itself within its positioning cylinder 82 to a corresponding distance, all the while being in constant synchronization with one another because of their closed fluid communication with one another.

It should be noted that the overall configuration of each driver arm, 22 or 23, inherently produces strength against any forces encountered in turning the wheel 26 against the tool 32 on the lathe 10.

There has been described a machine for automatically and efficiently resurfacing railroad wheels, wherein a single support member can be adjusted to encounter any diameter railroad wheel, (or any disc-like article needing securing) and a plurality of similar support members will correspondingly and simultaneously do likewise, those support members also being capable of reacting to any skewness of the wheel with respect to its axle. The machine has the added benefits of being less expensive than the prior art, while being stronger and more efficient.

Though the invention has been described with a certain degree of particularity, it is intended that appended claims are exemplary only and are not to be interpreted in a limiting sense.

Having thus described our invention what we claim as new and desire to secure by Letters Patent of the United States is:

1. A machine for turning articles between a pair of head stocks comprising opposing centers on a turning axis of said machine, said article being driven in rotation through frictional engagement with an arrangement of drivers mounted on at least one rotatably driven face plate, said machine comprising:
   at least two driver arms each pivotably mounted on a pivot post on each of said face plates for arcuate motion in a plane parallel to the plane of said face plate;
   each driver arm including a bit assembly mounted for slidable movement therewith along an axis perpendicular to the plane of said face plate;
   means for synchronously pivoting said driver arms so that the radial position with respect to said centers, of each of said bit assemblies on each of said face plates may be set to a corresponding radial dimension; and
   means for moving said bit assemblies into contact with said articles to be turned.

2. A machine for turning articles thereon, as recited in claim 1, wherein the means for moving said bit assemblies into contact with said articles to be turned is reciprocably fluctuatable to accomodate variations on the engagement surface of said article.

3. A machine for turning articles thereon, as recited in claim 1, wherein said means for synchronously pivoting said driver arms includes:
   an adjustable screw journalled in an elongated enclosure which is fixedly secured to said face plate;
   a plate adapted to move on said screw and axially in said elongated enclosure as said adjustable screw is turned;
   a member connecting a first one of said driver arms and said plate wherein pivotal movement is caused in said first driver arm when said adjustable screw is turned;
   a yoke rotatable on said face plate about said center; and
   a link pivotably connecting said rotatable yoke and said driver arms, so that when said adjustable screw is turned, said first driver arm pivots, pulling on its attached link causing rotation of said yoke, each of the remaining links pushing their respective driver arms about their pivots to cause their respective bit assemblies to move generally radially outwards on said face plate from said center.

4. A machine for turning articles thereon, as recited in claim 1, wherein said bit assembly is also mounted for rotation about its slidable motion axis to permit generally circumferential alignment of said bit assembly about said center, as said driver arm pivotally changes its radial position on said face plate.

5. A machine for turning articles thereon, as recited in claim 4, wherein said bit assembly comprises:
   a first cylinder mounted within the free swinging end of said driver arm, the axis of said cylinder being perpendicular to the plane of said face plate;
   a piston movably mounted within said first cylinder; and
   a bit block mounted on the outward end of said piston, said bit block having a plurality of bits disposed on its outer end.

6. A machine for turning articles thereon, as recited in claim 5, wherein said piston is keyed to said first cylinder to permit rotation therewith, and said bit block is keyed to said piston to also permit rotation therewith.

7. A machine for turning articles thereon, as recited in claim 5, wherein said bit assembly also comprises a closed pressurizable hydraulic system within said cylinders in said driver arms to permit said reciprocable fluctuation in the axial movement in said bit assemblies.

8. A machine for turning articles thereon, as recited in claim 6, wherein said first cylinder is pivotally connected to said pivot post by a swingable linkage bar, permitting said first cylinder and said piston to maintain the same orientation with respect to said center, regardless of the angular position of said driver arm on said face plate.

9. A machine for turning articles thereon, as recited in claim 8, wherein said articles comprise at least one railroad wheel, and wherein the bits in said bit assemblies frictionally engage the face of said railroad wheel adjacent its tread.

10. A machine for turning articles thereon, as recited in claim 9, wherein said bits are cylindrical members having concave outer ends to present a sharp circular edge to th engaged surface.

11. A machine for turning articles thereon, as recited in claim 9, wherein said frictional engagement between said bit assemblies and said article is caused by axial displacement of at least one of said head stocks toward the other head stock.

* * * * *